United States Patent
Herrmann et al.

(10) Patent No.: US 9,816,595 B2
(45) Date of Patent: Nov. 14, 2017

(54) TRANSMISSION DEVICE WITH A HYDRAULIC SYSTEM

(71) Applicant: ZF Friedrichshafen AG, Friedrichshafen (DE)

(72) Inventors: Markus Herrmann, Scheidegg (DE); Thilo Schmidt, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/113,671

(22) PCT Filed: Dec. 15, 2014

(86) PCT No.: PCT/EP2014/077714
§ 371 (c)(1),
(2) Date: Jul. 22, 2016

(87) PCT Pub. No.: WO2015/110222
PCT Pub. Date: Jul. 30, 2015

(65) Prior Publication Data
US 2017/0009866 A1 Jan. 12, 2017

(30) Foreign Application Priority Data
Jan. 22, 2014 (DE) .................. 10 2014 201 131

(51) Int. Cl.
*F16H 45/02* (2006.01)
*F16H 61/14* (2006.01)
(Continued)

(52) U.S. Cl.
CPC ............. *F16H 45/02* (2013.01); *F16D 25/14* (2013.01); *F16H 61/0206* (2013.01); *F16H 61/14* (2013.01); *F16H 61/143* (2013.01)

(58) Field of Classification Search
None
See application file for complete search history.

(56) References Cited

U.S. PATENT DOCUMENTS

2009/0111636 A1 4/2009 Gierer et al.
2011/0011075 A1* 1/2011 Sakamoto ............. F16H 61/143
60/329
(Continued)

FOREIGN PATENT DOCUMENTS

DE 102007000561 A1 4/2009
DE 102008042082 A1 3/2010
(Continued)

OTHER PUBLICATIONS

German Search Report DE102014201131.0, dated Dec. 14, 2015, (7 pages).
(Continued)

*Primary Examiner* — Mark Manley
(74) *Attorney, Agent, or Firm* — Dority & Manning, P.A.

(57) ABSTRACT

A hydraulic system for a transmission device includes a primary pressure circuit and a secondary pressure circuit suppliable with hydraulic fluid from a defined saturation condition of the primary pressure circuit. A converter lock-up clutch is subjected to an operating pressure by a converter clutch valve. An inner torus chamber is suppliable with hydraulic fluid at a converter pressure of the secondary pressure circuit by a converter switching valve and by a valve device and a throttle device of the primary pressure circuit. The throttle device of the primary pressure circuit is downstream of the valve device of the primary pressure circuit.

17 Claims, 4 Drawing Sheets

(51) Int. Cl.
*F16D 48/02* (2006.01)
*F16H 61/02* (2006.01)

(56) References Cited

U.S. PATENT DOCUMENTS

2014/0157766 A1    6/2014  Baraga et al.
2014/0231205 A1*   8/2014  Jinno ..................... F16H 61/14
                                                        192/3.33

FOREIGN PATENT DOCUMENTS

DE    102011109376 A1    2/2013
JP    WO2013084993    *  6/2013

OTHER PUBLICATIONS

International Search Report (English Translation) PCT/EP2014/077714, dated Feb. 25, 2015, (2 pages).

* cited by examiner

TRANSMISSION DEVICE WITH A HYDRAULIC SYSTEM

FIELD OF THE INVENTION

The invention relates generally to a transmission device with a hydraulic system.

BACKGROUND

From DE 10 2007 000 561 A1, a transmission device with a hydraulic system is known; the transmission device includes a primary pressure circuit and a secondary pressure circuit. The secondary pressure circuit can be supplied with hydraulic fluid from a defined saturation condition of the primary pressure circuit. In addition, the transmission device is designed with a hydrodynamic torque converter formed with a "three-line converter" and a converter lock-up clutch corresponding to the hydrodynamic torque converter. The converter lock-up clutch is actuated through the primary pressure circuit with an operating pressure that is adjustable in the area of the converter clutch valve. In the open operating state of the converter lock-up clutch, an inner torus chamber of the three-line converter is subjected to a converter pressure that is adjustable in the area of the converter pressure valve through a converter switching valve of the secondary pressure circuit. The operating pressure of the converter lock-up clutch applies in the closing direction, and the converter pressure in the inner torus chamber of the three-line converter applies in the opening direction of the converter lock-up clutch acting on the converter lock-up clutch.

In the control state and in the fully closed operating state of the converter lock-up clutch, the inner torus chamber of the three-line converter, starting from an area of the hydraulic system guided by an operating pressure of the converter lock-up clutch area, is subjected to hydraulic fluid. However, disadvantageously, during unsaturated operating states of the primary pressure circuit of the hydraulic system, this leads to the fact that function groups of the transmission device to be provided with hydraulic fluid by the primary pressure circuit, that is, in addition to the converter lock-up clutch and additional transmission components, such as switching elements and the like, including a cooling device of the three-line converter in a normal operating state and in a closed operating state of the converter lock-up clutch, are not subjected to hydraulic fluid in the necessary extent under certain circumstances.

In addition, actuator dynamics of the transmission device are impaired by the additional supply of the three-line converter through the primary pressure circuit with the converter lock-up clutch subjected to operating pressure. The volume flow of hydraulic fluid removed from the primary pressure circuit in the direction of the three-line converter can be compensated for by increasing, for example, a volume flow of hydraulic fluid made available through a main transmission pump; however, the additional supply of the hydraulic system of the transmission device takes place through the main transmission pump in a delayed extent, which impairs the desired high dynamics of a transmission device.

SUMMARY OF THE INVENTION

As such, exemplary aspects of the present invention provide a transmission device with a hydraulic system, with which a hydraulic supply of a torque converter is ensured, and which can be operated with desired high dynamics.

The transmission device in accordance with exemplary aspects of the invention is designed with a hydraulic system, which comprises a primary pressure circuit and a secondary pressure circuit. The secondary pressure circuit can be supplied with hydraulic fluid from a defined saturation condition of the primary pressure circuit. In addition, a hydrodynamic torque converter formed as a three-line converter and a converter lock-up clutch corresponding to the hydrodynamic torque converter are provided. The converter lock-up clutch is actuated through the primary pressure circuit with an operating pressure that is adjustable in the area of the converter clutch valve. In the open operating state of the converter lock-up clutch, an inner torus chamber of the three-line converter is subjected to a converter pressure that is adjustable in the area of the converter pressure valve through a converter switching valve of the secondary pressure circuit. The operating pressure of the converter lock-up clutch applies in the closing direction, and the converter pressure in the inner torus chamber of the three-line converter applies in the opening direction of the converter lock-up clutch acting on the converter lock-up clutch.

In accordance with exemplary aspects of the invention, with the converter lock-up clutch subjected to operating pressure by the converter clutch valve, the inner torus chamber can be supplied by the converter switching valve likewise with the converter pressure of the secondary pressure circuit adjustable in the area of the converter switching valve and by a valve device and a throttle device of the primary pressure circuit downstream of the valve device.

Given that, in both the non-actuated operating state and the actuated operating state of the converter lock-up clutch, the three-line converter of the transmission device in accordance with exemplary aspects of the invention is, above a defined saturation condition of the primary pressure circuit, subjected to hydraulic fluid starting from the secondary pressure circuit, the transmission device in accordance with exemplary aspects of the invention can be operated with the desired high dynamics. This results from the fact that, upon an elevated demand on the part of one or more transmission components to be supplied with hydraulic fluid through the primary pressure circuit, which causes at least a short-term under-supply of the primary pressure circuit, the volume flow of hydraulic fluid previously guided in the direction of the secondary pressure circuit for the additional supply of such transmission components can also be made available by the primary pressure circuit, immediately and without the corresponding actuation of a main transmission pump or another pressure source of the transmission device, on a basis that is current and essentially free of delays. In order to avoid under-supply states in the area of the three-line converter upon the presence of such a sequence of operating states, the three-line converter can be supplied, through the valve device and the throttle device of the primary pressure circuit downstream of the valve device, with a volume flow of hydraulic fluid that is reduced compared to the volume flow of hydraulic fluid from the state of the art, guided starting from the primary pressure circuit in the direction of the three-line converter, by which the leakage volume flows in the area of the inner torus chamber and the periphery of the torque converter can be compensated, and thus accumulations of air in the latter areas of the hydraulic system are avoided.

With an advantageous embodiment of the transmission device in accordance with exemplary aspects of the invention, in a first switching position of the converter switching valve, which features the converter switching valve in an open operating state of the converter lock-up clutch, the converter pressure valve is connected through the inner torus chamber of the three-line converter to a transmission cooler and a transmission lubricator (otherwise known as a transmission lubrication circuit), whereas, on the output side of the inner torus chamber of the three-line converter between the inner torus chamber and the transmission cooler and transmission lubricator, a check valve device is provided. It is thereby ensured that, with an open converter lock-up clutch, the inner torus chamber of the three-line converter is flowed through for a sufficient cooling of the three-line converter transferring the torque, starting from the secondary pressure circuit, in the direction of the transmission cooler and transmission lubricator. In addition, this design prevents, during unsaturated operating states of the primary pressure circuit, at which the secondary pressure circuit is not supplied with hydraulic fluid volume, the inner torus chamber of the three-line converter in the direction of the transmission cooler and transmission lubricator from being emptied during persistent under-supply operating states of the primary pressure circuit and thus also the secondary pressure circuit, and undesired accumulations of air from arising in the inner torus chamber. Thereby, the emptying is avoided in a simple manner by the check valve device.

In a second switching position of the converter switching valve, which features the converter switching valve with a converter lock-up clutch subjected to operating pressure, with an additional advantageous embodiment of the transmission device in accordance with exemplary aspects of the invention, the converter pressure valve is connected by the converter switching valve both to the transmission cooler and the transmission lubricator and to an entry of the inner torus chamber of the three-line converter, whereas, on the output side, the inner torus chamber is connected by the converter switching valve and the check valve device to an essentially unpressurized area.

This in turn ensures that a volume flow of hydraulic fluid introduced into the secondary pressure circuit in the actuated operating state of the converter lock-up clutch, at which the converter lock-up clutch is either fully closed or the transmission capacity of which is varied through the application of a defined operating pressure as a function of a corresponding request by a slip mode, on the one hand, is used for a desired cooling of the three-line converter through the inner torus chamber of the three-line converter and, on the other hand, is introduced in the inner torus chamber passing directly in the direction of the transmission cooler and transmission lubricator.

Since, on the output side, the inner torus chamber is connected by the converter switching valve and the check valve device with the essentially unpressurized area, in the inner torus chamber, a constant hydraulic pressure necessary for a good controllability for the transmission capacity of the converter lock-up clutch is adjusted. During under-supply operating states of the transmission device, during which the primary pressure circuit is present in an unsaturated operating state and the secondary pressure circuit is not subjected to hydraulic fluid volume, the constant hydraulic pressure in the inner torus chamber is in turn adjusted, starting from the primary pressure circuit, by the valve device and throttle device downstream of the valve device.

If the check valve device features a check valve arranged between the output of the inner torus chamber and the converter switching valve, the response limit of which is variable, by a single check valve, both the function necessary for the prevention of emptying the three-line converter with an open converter lock-up clutch and for the presentation of the constant hydraulic pressure in the inner torus chamber with an actuated converter lock-up clutch can be presented.

With an embodiment of the transmission device in accordance with exemplary aspects of the invention that is alternative to this, the check valve device features a check valve arranged between the output of the inner torus chamber and the converter switching valve and an additional check valve provided between the converter switching valve and the unpressurized area, whereas a response limit of the check valve is smaller than the response limit of the additional check valve and the prevention of emptying is made available by the additional check valve, while the constant pressure level in the inner torus chamber with an actuated converter lock-up clutch is ensured by the check valve.

If the check valve device is designed downstream of the inner torus chamber and between the converter switching valve and the transmission cooler and transmission lubricator with a check valve, and between the converter switching valve and the unpressurized area with an additional check valve, whereas a response limit of the check valve is smaller than the response limit of the additional check valve, the presentation of the constant pressure level in the inner torus chamber of the three-line converter upon an actuated converter lock-up clutch is influenced by manufacturing tolerances in the area of the check valve device to a lesser extent than the last described embodiment of the transmission device. This results from the fact that the volume flow of hydraulic fluid flowing from the inner torus chamber upon an actuated converter lock-up clutch is to be guided solely by the converter switching valve and the additional check valve provided between the converter switching valve and the unpressurized area for adjusting the desired constant pressure level in the inner torus chamber.

If the converter clutch valve and the converter switching valve can be subjected to a pilot pressure by an actuator device, the transmission device in accordance with exemplary aspects of the invention can be operated with little effort, since the switching of the converter switching valve provided respectively as a function of the current operating state of the converter lock-up clutch can be triggered or implemented in a simple manner as a function of the pilot pressure made available by the actuator device.

With an additional advantageous embodiment of the transmission device in accordance with exemplary aspects of the invention, a valve device is provided between the converter clutch valve and the converter lock-up clutch, by which the connection between the converter clutch valve and the converter lock-up clutch can be locked. Thus, in a simple manner, the option exists of maintaining the operating pressure applying at the converter lock-up clutch without an additional expenditure of energy through the corresponding actuation of the valve device and an accompanying blocking of the connection between the converter clutch valve and the converter lock-up clutch, and, in the area of hydraulic system present in relation to the converter lock-up clutch upstream of the valve device, energetically and favorably subjecting the desired pressure level. Thus, power losses arising with conventional hydraulic systems, in each case for maintaining an operating pressure of a converter lock-up clutch, such as those that arise through a conveying mode of a main transmission pump that is necessary for this, are avoidable in a structurally simple manner, if the area between the valve device and the converter lock-up clutch is designed to be correspondingly pressure-tight.

With an additional form of the transmission device in accordance with exemplary aspects of the invention that is structurally simple and characterized by a low need for installation space, a pressure signal can be applied at a valve slide of the valve device, which holds or transfers the valve device in or into an operating state that separates the connection between the converter clutch valve and the piston chamber of the converter lock-up clutch or releases the connection.

If, at the valve slide of the valve device, both the hydraulic pressure prevailing in the area between the converter clutch valve and the valve device and adjustable by the converter clutch valve and the hydraulic pressure prevailing in the area between the valve device and the converter lock-up clutch in each case can be applied in a direction separating the connection between the converter clutch valve and the converter lock-up clutch or releasing the connection, the transmission device in accordance with exemplary aspects of the invention can be operated with low steering and control effort.

Both the characteristics specified in the patent claims and the characteristics specified in the subsequent embodiments of the transmission device under the invention are, by themselves alone or in any combination with one another, suitable for providing additional forms for the object under the invention. In terms of the additional forms of the object under the invention, the particular combinations of characteristics do not represent a limitation; rather, they are essentially solely of an exemplary nature.

Additional advantages and advantageous embodiments of the transmission device in accordance with the invention arise from the patent claims and the embodiments described below, with reference to the drawing in terms of principle, whereas, in the description of the various embodiments, for the benefit of clarity, the same reference signs are used for structurally and functionally identical components.

BRIEF DESCRIPTION OF THE DRAWINGS

The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
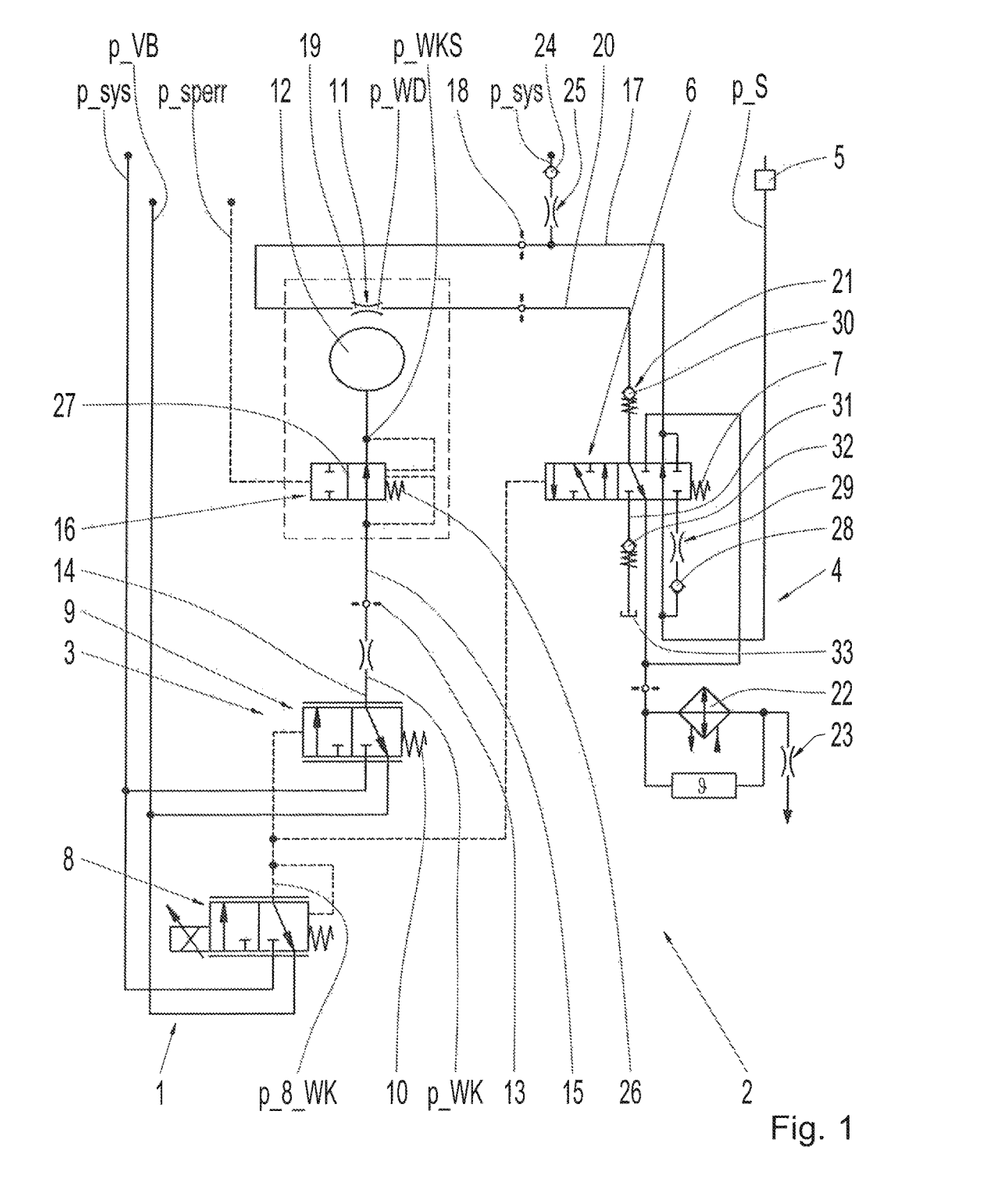
FIG. 1 a part of a hydraulic diagram of a hydraulic system of a first embodiment of the transmission device in accordance with exemplary aspects of the invention with a non-actuated converter lock-up clutch.

FIG. 1 shows a part of a hydraulic diagram of a hydraulic system 1 of a transmission device 2, whereas the hydraulic system 1 is designed with a primary pressure circuit 3 and a secondary pressure circuit 4. From a defined saturation condition of the primary pressure circuit 3, the secondary pressure circuit 4 can be supplied with hydraulic fluid. A pressure p_sys of the primary pressure circuit 3 is adjusted in the area of a system pressure valve (not shown in more detail). The system pressure p_sys is adjustable to the desired extent by a pressure regulator to the respectively present operating state of the transmission device 2 and a vehicle drive train designed for the transmission device 2.

Upon a corresponding saturation of the primary pressure circuit 3, hydraulic fluid volume is forwarded from a main transmission pump by the system pressure valve in the direction of the secondary pressure circuit 4. In the area of the converter pressure valve 5, a so-called "lubricating pressure" p_S is adjusted, which is applied at a converter switching valve 6. The converter switching valve 6 can be transferred counter to a spring force of a spring device 7 acting on the converter switching valve 6 by a pressure signal p_8_WK adjustable in the area of an electrohydraulic pressure regulator 8, from a switching position shown in FIG. 1 to a second switching position more specifically shown in FIG. 2.

The pressure signal p_8_WK also applies at a converter clutch valve 9 and counteracts a spring force of a spring device 10 of the converter clutch valve 9. The pressure signal p_8_WK depends on the system pressure p_sys that applies at the electrohydraulic pressure regulator 8. In addition, the system pressure p_sys is also guided in the direction of the converter clutch valve 9, in the area of which, as a function of the pressure signal p_8_WK, an operating pressure p_WK is adjustable for actuating a converter lock-up clutch 12 allocated to a hydrodynamic torque converter 11 designed as a three-line converter.

Figure 2:
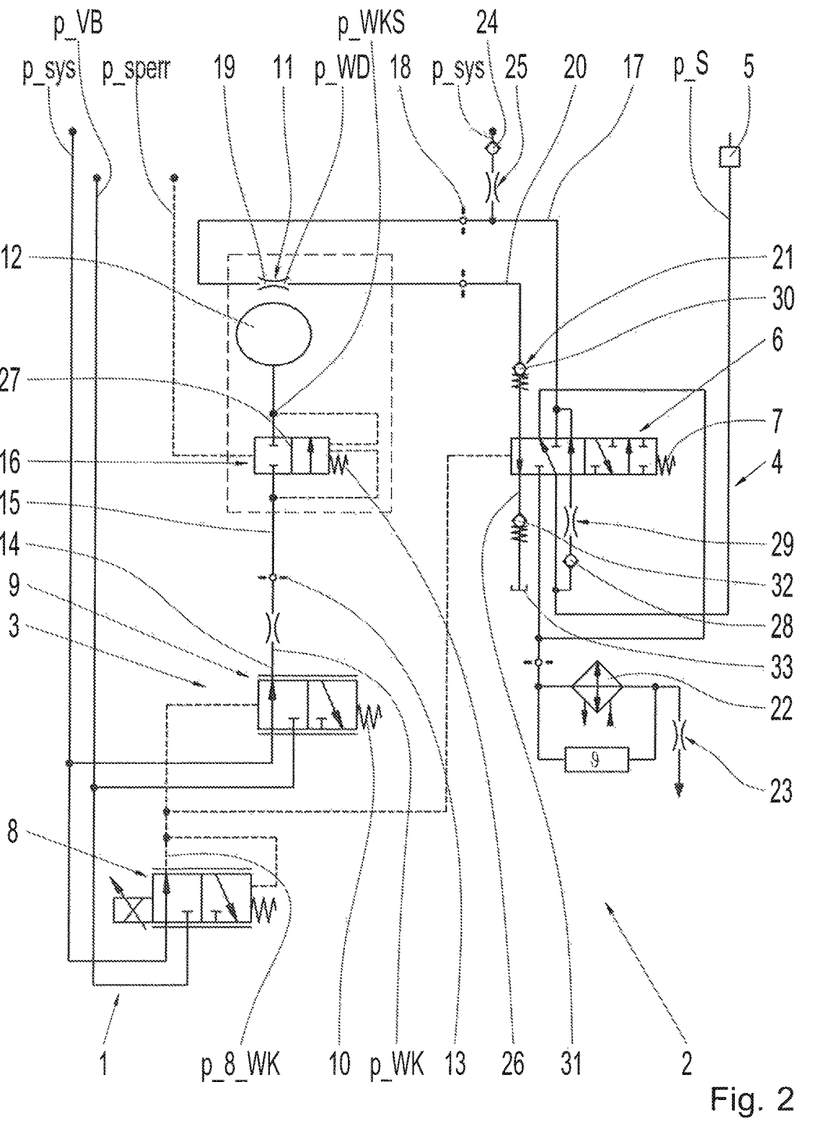
FIG. 2 a presentation corresponding to FIG. 1 of the transmission device with an actuated converter lock-up clutch.

Downstream of the converter clutch valve 9, with exemplary aspects of the present invention, a rotary oil supply 13 that is only schematically shown is provided, in the area of which the hydraulic fluid volume guided by the converter clutch valve 9 in the direction of the converter lock-up clutch 12 is introduced from an oil guide channel 14 on the housing side into an additional oil guide channel 15 provided in the area of a rotating component of the transmission device 2. In turn, downstream of the rotary oil supply 13, in the additional oil guide channel 15, a valve device 16 is provided, in the area of which the connection between the converter clutch valve 9 and a piston chamber of the converter lock-up clutch 12 can be separated or can be established. Thereby, the connection between the converter clutch valve 9 and the converter lock-up clutch 12 in the position, shown in FIG. 1, of the valve device 16 in the area of the valve device 16 is released, while the converter lock-up clutch 12 in the operating state of the valve device 16 shown in FIG. 2 is separated from the converter clutch valve 9.

In addition to the system pressure p_sys, a pre-filling pressure p_VB is applied at the converter clutch valve 9 and also at the electro-hydraulic pressure regulator 8, through which, in the area of the primary pressure circuit 3, a pre-filling pressure level is maintained, through which undesirable accumulations of air in areas of the primary pressure circuit 3 currently not subjected to system pressure p_sys are prevented with little effort. Through the subjecting of the converter clutch valve 9 and thus the converter lock-up clutch 12 to the pre-filling pressure p_VB, in a simple manner, this prevents the hydraulic fluid volume prevailing in this area from flowing out based on the force of gravity acting on the liquid column with an increasing operating time and undesired air pockets from forming in this area, which would delay a subsequent start-up and actuation of the converter lock-up clutch 12 and impair the functioning of the converter lock-up clutch.

In the operating state of the hydraulic system 1 shown in FIG. 1, the converter lock-up clutch 12 is essentially fully opened, by which a torque to be transferred in the vehicle drive train between a drive motor and an output is guided essentially completely through the hydrodynamic torque converter 11. In order to hold the hydrodynamic torque converter 11 in an operating state required for this purpose and to dissipate from the torque converter 11 heat losses arising during the hydrodynamic transmission of the applied torque, the hydrodynamic torque converter 11 downstream of the converter switching valve 6 is supplied with hydraulic fluid volume starting from the secondary pressure circuit 4 through a line 17, if the primary pressure circuit 3 features a corresponding saturation condition. Thereby, the hydraulic fluid volume fed through the line 17 is in turn introduced through a rotary oil supply 18 and through an inlet of the torque converter 11 into an inner torus chamber 19 of the hydrodynamic torque converter 11, and flows through this. Subsequently, the hydraulic fluid volume once again exits through an outlet of the torque converter 11 from the inner torus chamber 19 of the torque converter 11, and is introduced through the rotary oil supply 18 into an additional line 20, which in turn leads back to the converter switching valve 6. Between the rotary oil supply 18 and the converter switching valve 6, a check valve device 21 is provided, the response limit of which, with exemplary aspects of the present invention, is approximately one-tenth (0.1) bar, in order to prevent the undesired emptying of the hydrodynamic torque converter 11 in an unsupplied operating state. In the first switching position of the converter switching valve 6 shown in FIG. 1, the hydraulic fluid volume derived from the inner torus chamber 19 flows in the direction of a transmission cooler 22 and a transmission lubricator 23. The transmission lubricator 23 is serially arranged on transmission cooler 22 and follows the transmission cooler 22.

In addition to the supply of the torque converter 11 starting from the secondary pressure circuit 4, it is provided that, in the presence of defined lower under-supply operating states on the part of the primary pressure circuit 3 leading the system pressure $p\_sys$, the torque converter 11 can be subjected to hydraulic fluid volume through a valve device 24 designed, with exemplary aspects of the present invention, as a check valve and a downstream throttle device 25.

This ensures that, in unsaturated operating states of the primary pressure circuit 3, at which the secondary pressure circuit 4 is not supplied with hydraulic fluid volume by the system pressure valve, the hydraulic fluid volume from the primary pressure circuit 3 is guided by the valve device 24 and the throttle device 25 in the direction of the inner torus chamber 19 through the rotary oil supply 18. At that point, without a corresponding supply of the torque converter 11, the torque converter 11, starting from the secondary pressure circuit 4, for compensating leakage oil volume flows through the primary pressure circuit 3 arising in the area of the rotary oil supply 18 and also present in the area of the torque converter 11 itself, is supplied with a quantity of transmission oil that is essentially lower compared to the transmission devices known in the state of the art and an operating state of the torque converter 11 that is necessary for the functioning of the torque converter 11 is maintained with little effort.

If there is a request for increasing the transmission capacity of the converter lock-up clutch 12, in the area of the pressure regulator 8, a pressure signal $p\_8\_WK$ corresponding to the requested transmission capacity of the converter lock-up clutch 12 is issued, in order to transfer the converter clutch valve 9 into the operating state shown in FIG. 2, at which the applied system pressure $p\_sys$ is forwarded in the direction of the valve device 16 in the correspondingly requested scope as operating pressure $p\_WK$. The operating pressure $p\_WK$, which is applied on the valve device 16 upstream of the valve device 16, applies on a valve slide 27 of the valve device 16 with the same effect as a spring force of a spring device 26. In addition, the operating pressure $p\_WKS$ prevailing downstream of the valve device 16 applies on the valve slide 27 with the same effect as the operating pressure $p\_WK$ and as the spring force of the spring device 26, by which the valve device 16 is transferred to the operating state shown in FIG. 1 with operating pressure $p\_WK$ adjusted through the converter clutch valve 9, and the transmission capacity of the converter lock-up clutch 12 is adjusted in the requested scope.

Since the pressure $p\_WD$ acting in the inner torus chamber 19 acts on a piston element of the converter lock-up clutch 12 in the opening direction and thus counteracts the operating pressure $p\_WKS$ of the converter lock-up clutch 12, a good controllability of the converter lock-up clutch 12 in pressure conditions that are essentially approximately constant in the inner torus chamber 19 of the hydrodynamic torque converter 11 is desired. As a general rule, this is not ensured in the first switching position of the converter switching valve 6 to an extent necessary for a good controllability of the converter lock-up clutch 12 by the supply (which changes under certain circumstances) by the secondary pressure circuit 4 and the primary pressure circuit 3. Therefore, the converter switching valve 6 of the pressure signal $p\_8\_WK$ that is operated in a controlled manner above a defined pressure value and already prior to the converter lock-up clutch 12 is switched from the first switching position into the second switching position shown in FIG. 2.

In the second switching position of the converter switching valve 6, above a defined pressure level of the lubricating pressure $p\_S$, which is greater than the response limit of a check valve device 28, the torque converter 11 or inner torus chamber 19 of the torque converter 11 is subjected to hydraulic fluid volume starting from the secondary pressure circuit 4. Subsequently, the hydraulic fluid volume fed by the converter pressure valve 5 is led in one part by the check valve device 28, through a throttle device 29 provided downstream of the check valve device 28 and the converter switching valve 6, into the line 17. In addition, hydraulic fluid volume guided by the converter pressure valve 5 is forwarded in the other part parallel to the check valve device 28 and the throttle device 29 on the torque converter 11 passing through the converter switching valve 6 in the direction of the transmission cooler 22 and the transmission lubricator 23.

Downstream of the inner torus chamber 19 of the torque converter 11, the additional line 20 with the check valve device 21, which comprises a so-called "converter retaining valve" 30 upstream of the switching valve device 6, is connected by the converter switching valve 6 to an additional line 31, which is in turn designed downstream of the converter switching valve 6 with an additional check valve 32 or with a converter base point valve of the check valve device 21. With exemplary aspects of the present invention, the converter base point valve 32 is arranged between the converter switching valve 6 and an unpressurized area 33, and features a response limit of approximately one (1) bar, in order to present, in the area of the inner torus chamber 19, the constant pressure conditions required for a good controllability of the converter lock-up clutch 12, independent of the supply of the torque converter 11, starting from the secondary pressure circuit 4, or from a supply starting from the primary pressure circuit 3 through the valve device 24 and the throttle device 25, with low steering and control effort.

In the essentially closed operating state of the converter lock-up clutch 12, the option exists of maintaining the operating pressure p_WKS of the converter lock-up clutch 12 that is prevailing downstream of the valve device 16 without the operating pressure p_WK that is correspondingly prevailing upstream of the valve device in the operating state shown in FIG. 2 by the valve device 16. For this purpose, on the valve slide 27 of the valve device 16, a locking pressure p_sperr counteracting the spring force of the spring device 26 along with the operating pressure p_WKS and the operating pressure p_WK can be applied, in order to transfer the valve slide 27 into the switching position shown in FIG. 2. For this purpose, the hydraulic system 1 in the area between the valve device 16 and the converter lock-up clutch 12, as well as in the area of the valve device 16 and in the area of the converter lock-up clutch 12, is correspondingly designed to be pressure-tight, and leakage volume flows present in this area are so small that, essentially in the locking operating state of the valve device 16, the pressure p_WKS is maintained at a level that is at least approximately constant. Thus, in the locking operating state of the valve device 16, the option exists of reducing the operating pressure p_WK upstream of the valve device 16 in a manner corresponding to the pre-filling pressure level p_VB, and holding the converter lock-up clutch 12 in a closed operating state without an expenditure of energy that produces power losses and thus operating the transmission device 2 with a desired high overall degree of efficiency.

Figure 3:
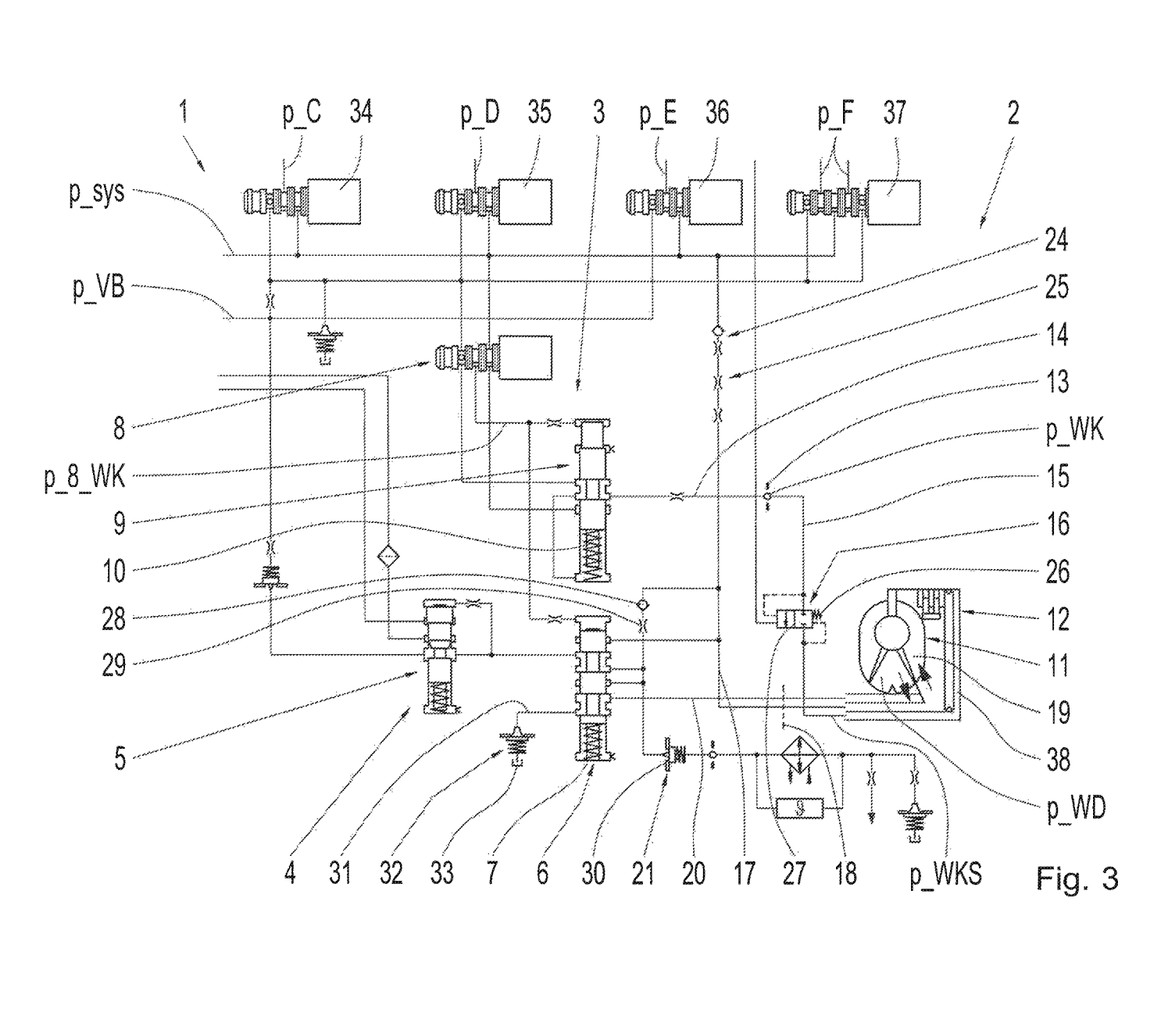
FIG. 3 a hydraulic diagram of a hydraulic system of a second embodiment of the transmission device in accordance with exemplary aspects of the invention.

FIG. 3 shows a presentation, which essentially corresponds to FIG. 1 and FIG. 2, of a second embodiment of the hydraulic system 1 of a transmission device 2, which, in principle, is subject to the same functionality as the hydraulic system 1 of FIG. 1 and FIG. 2, and is essentially distinguished from the hydraulic system 1 in accordance with FIG. 1 and FIG. 2 in the area of the valve device 16 and in the area of the converter retaining valve 30. For these reasons, in the following description, only the differences between the two hydraulic systems 1 will essentially be specifically addressed, and, with respect to the further functioning of the hydraulic system 1 in accordance with FIG. 3, reference is made to FIG. 1 and FIG. 2. The part of the hydraulic system 1 shown in FIG. 3 shows, in addition to the components described more specifically in FIG. 1 and FIG. 2, additional pressure regulators 34 to 37, to which the system pressure p_sys applies as the system pressure p_sys does to pressure regulator 8, and in the area of which the respective operating pressures p_C, p_D, p_E, p_F are adjustable for switching elements of the transmission device 2, in order to actuate these to an extent corresponding to the presentation of various transmission ratios in the area of the transmission device 2.

With the version of the hydraulic system 1 in accordance with FIG. 3, the operating pressure p_WK acting upstream of the valve device 16 applies with the same effect as the locking pressure p_sperr and the spring force of the spring device 26 and the operating pressure p_WKS prevailing downstream of the valve device 16 counteracting the valve slide 27 of the valve device 16. Thereby, the surface ratio of the control surfaces of the valve slide 27, at which the respective operating pressures p_WK and p_WKS apply, is equal to one (1). In contrast to this, the locking pressure p_sperr applied at the valve slide 27 is translated in the area of the valve device 16 with a transmission ratio of 2:1, by which, for example, with a pressure value of twelve (12) bar of the pressure p_WKS downstream of the valve device 16, the valve device 16 can be transferred, with a locking pressure p_sperr up to approximately seven (7) bar, into an operating state releasing the connection between the converter clutch valve 9 and the converter lock-up clutch 12.

Thus, in contrast to the valve device 16 in accordance with FIG. 1 and FIG. 2, the valve device 16 of the hydraulic system 1 in accordance with FIG. 3, without a corresponding applied locking pressure p_sperr, is held by the spring device 10 in the operating state separating the connection between the converter clutch valve 9 and the converter lock-up clutch 12, and thus constitutes a so-called "normally closed valve," through which a guided venting of the converter lock-up clutch 12 and an accompanying guided reduction of the transmission capacity of the converter lock-up clutch 12 can be realized with little effort.

Figure 4:
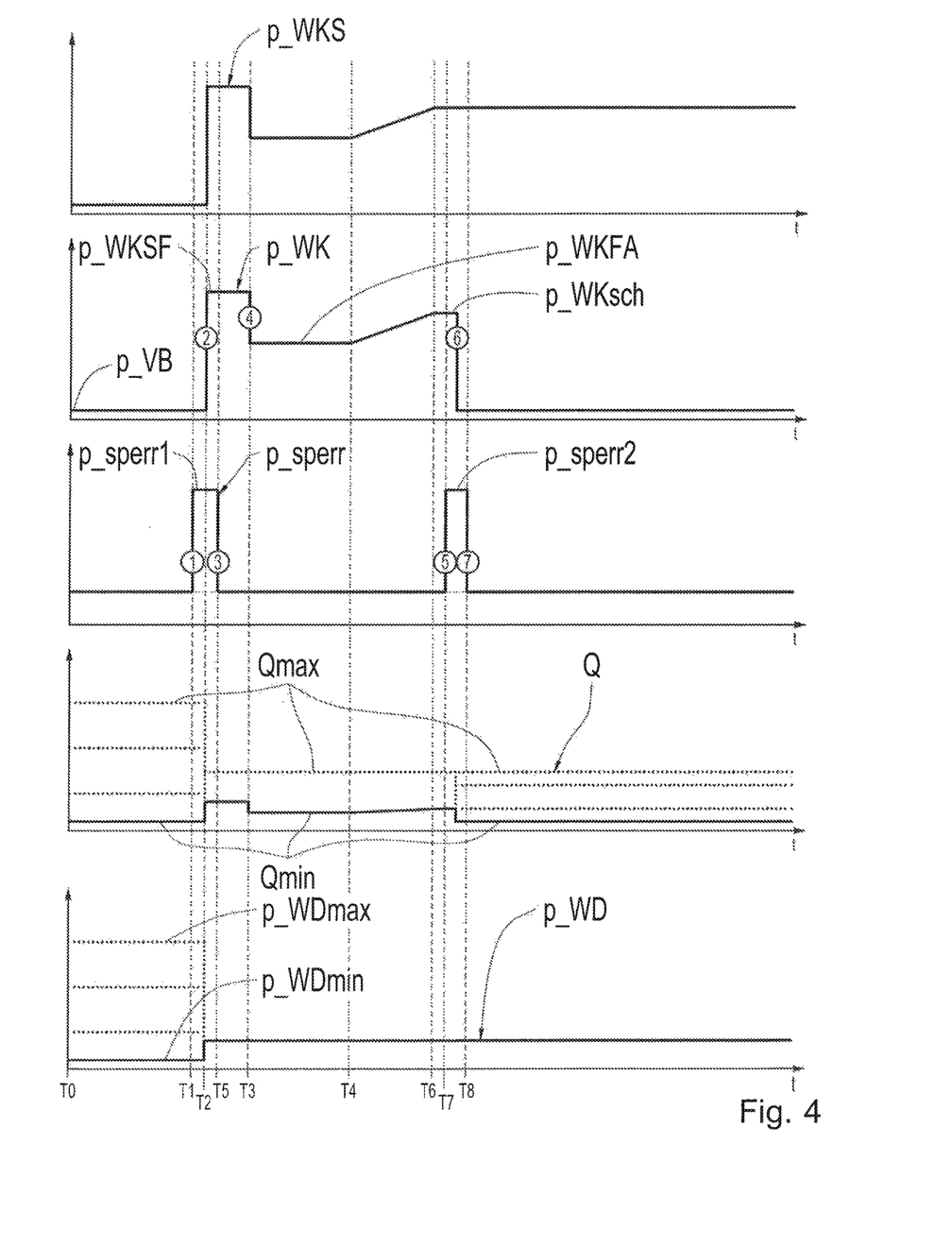
FIG. 4 multiple sequences of different operating state parameters of the transmission device in accordance with FIG. 1 or in accordance with FIG. 3 over time t.

In FIG. 4, several sequences of different operating state parameters of the hydraulic system 1 in accordance with FIG. 1 and FIG. 2 and in accordance with FIG. 3 are shown, which are adjusted over time t during a sequence of operating states of the hydraulic system 1 starting from a fully open operating state up to a fully closed operating state of the converter lock-up clutch 12.

At a point in time T0, the converter lock-up clutch 12 is fully opened, and both the operating pressure p_WK upstream of the valve device 16 and the operating pressure p_WKS downstream of the valve device 16 essentially correspond to the pre-filling pressure level p_VB. The locking pressure p_sperr features a pressure level equivalent to this, at which the valve device 16 connects the converter lock-up clutch 12 to the converter clutch valve 9.

A volume flow of hydraulic fluid Q guided by the inner torus chamber 19 of the torque converter 11, which is a function of the system pressure p_sys, features a value varying between a minimum value Q_min and a maximum value Q_max, depending on the system pressure p_sys that is currently prevailing. Thereby, the minimum value Q_min is adjusted in the unsaturated state of the primary pressure circuit 3, at which the secondary pressure circuit 4 is not subjected to hydraulic fluid volume. In this operating state of the hydraulic system 1 in accordance with FIG. 1 or FIG. 3, the flow of the torque converter 11 is maintained by the valve device 24 and the throttle device and/or the supply aperture 25 starting from the primary pressure circuit 3. In contrast to this, the maximum flow value Q_max in the area of the inner torus chamber 19 of the torque converter 11 is adjusted upon a fully saturated operating state of the primary pressure circuit 3 with, at the same time, a maximum prevailing system pressure p_sys.

The converter pressure p_WD adjusted in each case in the inner torus chamber 19 of the torque converter 11 varies at the point in time T0 likewise as a function of the respectively prevailing system pressure p_sys and the dependent lubricating pressure p_S between a minimum value p_WDmin and a maximum value p_WDmax, whereas the minimum value p_WDmin and the maximum value p_WDmax and the respective intermediate pressure values of the converter pressure p_WD in turn are adjusted to the above-described operating states of the hydraulic system 1 in accordance with FIG. 1 or FIG. 3, at which the minimum converter flow Q_min or the maximum converter flow Q_max or the intermediate volume flows in the inner torus chamber 19 are present. In the open state of the converter lock-up clutch 12, the inner torus chamber 19 of the torque converter 11, that is, present at the point in time T0, is flowed through and cooled with hydraulic fluid by the secondary pressure circuit 4 serially at the transmission cooler 22 and the transmission lubricator 23. Thereby, the flow rate Q and the converter pressure $p\_WD$ are controlled by the converter pressure valve 5 independent of the system pressure.

At a point in time T1, a request is issued for increasing the transmission capacity of the converter lock-up clutch 12. In order to subject the converter lock-up clutch 12 to operating pressure $p\_WK$ or $p\_WKS$, as the case may be, to the desired extent, with the hydraulic system 1 in accordance with FIG. 1, the locking pressure $p\_sperr$ is raised to a pressure value $p\_sperr1$ to an extent shown by the continuous line, at which the valve device 16 is securely held in the locking operating state. At the same time, on the basis of the request to close the converter lock-up clutch 12 at the point in time T1, the system pressure $p\_sys$ and the locking pressure $p\_sperr$ are raised in order to subsequently open in a defined manner the valve device 16 of the converter lock-up clutch 12 above the pressure $p\_WK$ and to rapidly fill the converter lock-up clutch 12 in the manner that is described more specifically below.

At a point in time T2 following the point in time T1, the converter clutch valve 9 is subjected to a corresponding pressure signal $p\_8\_WK$ starting from the pressure regulator 8, and a rapid filling pressure level $p\_WKSF$ of the operating pressure $p\_WK$ applies at the valve device 16. This leads to the fact that the valve device 16 in operating state of valve device 16 releasing the connection between the converter clutch valve 9 and the converter lock-up clutch 12 is transferred counter to the applied locking pressure $p\_sperr$, and a piston chamber 38 of the converter lock-up clutch 12, more specifically shown in FIG. 3, is subjected to rapid filling pressure $p\_WKSF$ up to a point in time T3 with a so-called "rapid filling pulse."

At the point in time T3, the operating pressure $p\_WK$ and thus the operating pressure $p\_WKS$ is lowered downstream of the valve device 16 to a filling compensation level $p\_WKFA$ and is left at this level until a point in time T4. At the point in time T2, the actuation of the converter clutch valve 9 by the pressure regulator 8 leads to the fact that the converter switching valve 6 of the pressure signal $p\_8\_WK$ is pushed out of the switching position shown in FIG. 1 into the switching position shown in FIG. 2, and the inlet of the torque converter 11 or the line 17 is switched in parallel with the transmission cooler 22 and the transmission lubricator 23.

The multi-disks of the converter lock-up clutch 12 are fully applied to each other at the point in time T4. Starting from such operating state of the converter lock-up clutch 12, any further pressure increase in the operating pressure $p\_WK$ or $p\_WKS$, as the case may be, causes an immediate increase in the transmission capacity of the converter lock-up clutch 12.

At a further point in time T5 that lies between the points in time T2 and T3, the locking pressure $p\_sperr$ is lowered again by the pressure value $p\_sperr1$ to the level at the point in time T0, in order to reduce power losses. The lowering of the locking pressure $p\_sperr$ has no effect on the operating state of the valve device 16, since this is held in the operating state releasing the connection between the converter clutch valve 9 and the converter lock-up clutch 12 by the operating pressure $p\_WK$ or $p\_WKS$, as the case may be, and the spring device 26. In addition, from the point in time T4, the operating pressure $p\_WK$ and thus also the operating pressure $p\_WKS$ prevailing downstream of the valve device 16 are guided by a pressure ramp to a closing pressure level $p\_WKsch$, at which the converter lock-up clutch 12 is essentially fully closed and features full transmission capacity of the converter lock-up clutch 12. With exemplary aspects of the present invention, the operating pressure $p\_WK$ or $p\_WKS$, as the case may be, reaches the closing pressure level $p\_WKsch$, and is subsequently left at this level.

In order to hold the closing pressure level $p\_WKsch$ in the area of the converter lock-up clutch 12 at an essentially energy-neutral level, at a point in time T7, the locking pressure $p\_sperr$ is raised once again to a pressure value $p\_sperr2$, at which the valve device 16 is securely transferred into the operating state locking the connection between the converter clutch valve 9 and the converter lock-up clutch 12 counter to the operating pressures $p\_WK$ and $p\_WKS$ applied at the valve slide 27. This leads to the fact that the operating pressure $p\_WKS$ prevailing downstream of the valve device 16 is locked up, and, in the closed operating state, the converter lock-up clutch 12 is subjected to the desired extent with the closing pressure $p\_WKsch$ required to hold the converter lock-up clutch 12, without any expenditure of energy. Subsequently, the pressure $p\_WK$ upstream of the valve device 16 is lowered from the closing pressure level $p\_WKsch$ to the pre-filling pressure level $p\_VB$, by which power losses, which, with an open valve device 16, are required to maintain the operating pressure $p\_WKS$, are avoided.

In conjunction with the raising of the system pressure $p\_sys$, the increased hydraulic fluid volume requirements triggered by the above-described rapid filling of the converter lock-up clutch 12 brings about the fact that, starting from the minimum value $Q\_min$, the converter flow rate Q at the point in time T2 increases to the minimum flow level shown in FIG. 4 from the point in time T2 or decreases to the maximum flow volume $Q\_max$ shown in FIG. 4 from the point in time T2.

At the point in time T3, based on the reduction of the operating pressure $p\_WK$ or $p\_WKS$, as the case may be, which is accompanied by a reduction in the system pressure $p\_sys$, the sequence of the minimum flow $Q\_min$ is once again lowered, in order to, starting from the point in time T4, in a slightly ascending manner up to the point in time T6, subsequently assume a value corresponding to the closing pressure level $p\_WKsch$ of the operating pressure $p\_WK$ of the converter lock-up clutch 12. At the point in time T7, the sequence $Q\_min$ of the minimum torus flow once again falls to the level at the point in time T0. From the point in time T2, the sequence of the maximum torus flow $Q\_max$ of the torque converter 11 remains essentially at a constant level.

The torus pressure $p\_WD$ varies between the points in time T0 to T2 based on the above-described operation of the hydraulic system 1 in accordance with FIG. 1 or FIG. 3, and, from the point in time T2, at which the converter switching valve 6 is pushed into second switching position of the converter switching valve 6 and the converter pressure $p\_WD$ is equal the response limit of the converter clutch base point valve 32, features a constant sequence.

Since, at the point in time T8, the operating pressure $p\_WK$ essentially features the pre-filling pressure level $p\_VB$ upstream of the valve device 16, only force components that are reduced and act in the direction of the released operating state of the valve device 16 and counteract the locking pressure $p\_sperr$ act on the valve slide 27, by which the locking pressure $p\_sperr$ in turn can be lowered from the pressure value $p\_sperr2$ to the pressure level at the point in time T0, in order to reduce the energy consumption during operation of the transmission device 2.

In contrast to the preceding description with respect to the pressure increase and pressure reduction of the locking pressure p_sperr during the actuation of the hydraulic system 1 in accordance with FIG. 1, with the version of the hydraulic system 1 in accordance with FIG. 3, the option exists of, in a simple manner, leaving the locking pressure p_sperr at the pressure level at the point in time T0 during the entire actuation of the converter lock-up clutch 12, since the valve device 16 can be actuated in the extent required for the actuation of the converter lock-up clutch 12 solely through the respective applied operating pressures p_WK and p_WKS without additional steering and control of the locking pressure p_sperr. After the control phase of the converter lock-up clutch 12 is terminated at the point in time T8, the pressure signal p_8_WK is guided to a pressure level at which the converter switching valve 6 is held securely in the second switching position, in order to ensure the aforementioned constant pressure conditions in the area of the inner torus chamber 19.

With both versions of the hydraulic system 1, the cooling of the torque converter 11 is designed such that, with an opened operating state of the converter lock-up clutch 12, significantly more hydraulic fluid volume flows through the torque converter 11 than with the closed converter lock-up clutch 12.

In principle, with both embodiments of the hydraulic system of the transmission device in accordance with exemplary aspects of the invention, it is ensured that, across the entire operating range of the transmission device, at least a minimal flow of the hydrodynamic torque converter and thus a corresponding converter cooling are present. Thereby, considerable pressure variations in the area of the inner torus chamber of the hydrodynamic torque converter with a non-switched converter pressure valve are avoided, in order to avoid a loss of transmission capacity in the area of the converter lock-up clutch and the associated risk of an unwanted clutch slippage.

In addition, on the basis of the supply of the hydrodynamic torque converter that is reduced in comparison to the transmission devices known from the state of the art, starting from the primary pressure circuit, through which the hydrodynamic torque converter is supplied only upon undersupply operating states of the secondary pressure circuit, the transmission device in accordance with exemplary aspects of the invention can be operated with higher dynamics.

Modifications and variations can be made to the embodiments illustrated or described herein without departing from the scope and spirit of the invention as set forth in the appended claims.

REFERENCE SIGNS

1 Hydraulic system
2 Transmission device
3 Primary pressure circuit
4 Secondary pressure circuit
5 Converter pressure valve
6 Converter switching valve
7 Spring device
8 Pressure regulator
9 Converter clutch valve
10 Spring device
11 Torque converter
12 Converter lock-up clutch
13 Rotary oil supply
14 Oil guide channel
15 Additional oil guide channel
16 Valve device
17 Line
18 Rotary oil supply
19 Inner torus chamber
20 Additional line
21 Check valve device
22 Transmission cooler
23 Transmission lubricator
24 Valve device
25 Throttle device
26 Spring device
27 Valve slide
28 Check valve device
29 Throttle device
30 Check valve, converter retaining valve
31 Additional line
32 Additional check valve device
33 Unpressurized area
34 to 37 Pressure regulators
38 Piston chamber
p_S Lubricating pressure
p_sperr Locking pressure
p_sperr1, p_sperr2 Discrete values of the locking pressure
p_sys System pressure
p_VB Pre-filling pressure
p_WD Converter pressure
p_WDmax Maximum converter pressure
p_WDmin Minimum converter pressure
p_WK Operating pressure of the converter lock-up clutch upstream of the valve device 16
p_WKFA Filling compensation pressure of the operating pressure of the converter lock-up clutch
p_WKS Operating pressure of the converter lock-up clutch downstream of the valve device 16
p_WKsch Closing pressure of the operating pressure of the converter lock-up clutch
p_WKSF Rapid filling pressure of the operating pressure of the converter lock-up clutch
p_8_WK Pressure signal
Q Converter flow
Q_min Minimum converter flow
Q_max Maximum converter flow
T0 to T8 Discrete points in time
t Time

The invention claimed is:

1. A hydraulic system for a transmission device, comprising:
a hydrodynamic torque converter designed as a three-line converter, the hydrodynamic torque converter having a converter lock-up clutch;
a primary pressure circuit; and
a secondary pressure circuit suppliable with hydraulic fluid at a defined saturation condition of the primary pressure circuit;
wherein the converter lock-up clutch is actuatable through the primary pressure circuit with an operating pressure that is adjustable by a converter clutch valve, an inner torus chamber of the hydrodynamic torque converter subjected to a converter pressure that is adjustable by a converter pressure valve and applied to the inner torus chamber by a converter switching valve of the secondary pressure circuit in an open operating state of the converter lock-up clutch, the operating pressure of the converter lock-up clutch applicable in a closing direction of the converter lock-up clutch, the converter pressure in the inner torus chamber of the torque converter applicable in an opening direction of the converter lock-up clutch, wherein, with the converter lock-up clutch subjected to the operating pressure by the converter clutch valve, the inner torus chamber is suppliable with hydraulic fluid from the secondary pressure circuit by the converter switching valve and the inner torus chamber is also suppliable with hydraulic fluid from the primary pressure circuit by a first valve device and a throttle device, the throttle device positioned downstream of the first valve device, and wherein a second valve device is provided between the converter, clutch, valve, and the converter lock-up clutch, a connection between the converter clutch valve and the converter lock-up clutch closable with the second valve device such that the second valve device maintains the operating pressure at the converter lock-up clutch.

2. The hydraulic system of claim 1, wherein:

a first switching position of the converter switching valve features the converter switching valve in an open operating state of the converter lock-up clutch;

in the first switching position of the converter switching valve, the converter pressure valve is connected through the inner torus chamber of the torque converter to a transmission cooler and a transmission lubrication circuit; and a check valve device is provided on an output of the inner torus chamber of the hydrodynamic torque converter between the inner torus chamber and the transmission cooler and transmission lubrication circuit.

3. The hydraulic system of claim 2, wherein:

in a second switching position of the converter switching valve the converter lock-up clutch is subjected to the operating pressure;

in the second switching position of the converter switching valve, the converter pressure valve is connected by the converter switching valve both to the transmission cooler and the transmission lubrication circuit and to an entry of the inner torus chamber of the torque converter; and in the second switching position of the converter switching valve, the inner torus chamber is connected by the converter switching valve and the check valve device to an essentially unpressurized area on the output of the inner torus chamber.

4. The hydraulic system of claim 3, wherein the check valve device includes a check valve arranged between the output of the inner torus chamber and the converter switching valve, the response limit of the check valve being variable.

5. The hydraulic system of claim 3, wherein the check valve device includes a check valve arranged between the output of the inner torus chamber and the converter switching valve and an additional check valve provided between the converter switching valve and the essentially unpressurized area, a response limit of the check valve being less than a response limit of the additional check valve.

6. The hydraulic system of claim 3, wherein the check valve device includes a check valve arranged downstream of the inner torus chamber and between the converter switching valve and the transmission cooler and transmission lubrication circuit, the check valve device also includes an additional check valve provided between the converter switching valve and the essentially unpressurized area, a response limit of the check valve being less than a response limit of the additional check valve.

7. The hydraulic system of claim 1, wherein the converter clutch valve and the converter switching valve are subjectable to a pilot pressure by an actuator device.

8. The hydraulic system of claim 1, wherein a pressure signal is applicable at a valve slide of the second valve device the pressure signal at the valve slide either establishing the connection between the converter clutch valve and the converter lock-up clutch or blocking the connection between the converter clutch valve and the converter lock-up clutch.

9. The hydraulic system of claim 8, wherein, at the valve slide of the second valve device, both the hydraulic pressure prevailing between the converter clutch valve and the second valve device and adjustable by the converter clutch valve and the hydraulic pressure prevailing between the second valve device and the converter lock-up clutch is applicable in a direction separating the connection between the converter clutch valve and the converter lock-up clutch or in a direction releasing the connection between the converter clutch valve and the converter lock-up clutch.

10. A hydraulic system for a transmission device, comprising:

a hydrodynamic torque converter designed as a three-line converter, the hydrodynamic torque converter having a converter lock-up clutch;

a primary pressure circuit; and a secondary pressure circuit suppliable with hydraulic fluid at a defined saturation condition of the primary pressure circuit;

wherein the converter lock-up clutch is actuatable through the primary pressure circuit with an operating pressure that is adjustable by a converter clutch valve, an inner torus chamber of the hydrodynamic torque converter subjected to a converter pressure that is adjustable by a converter pressure valve and applied to the inner torus chamber by a converter switching valve of the secondary pressure circuit in an open operating state of the converter lock-up clutch, the operating pressure of the converter lock-up clutch applicable in a closing direction of the converter lock-up clutch, the converter pressure in the inner torus chamber of the torque converter applicable in an opening direction of the converter lock-up clutch, wherein, with the converter lock-up clutch subjected to the operating pressure by the converter clutch valve, the inner torus chamber is suppliable with hydraulic fluid from the secondary pressure circuit by the converter switching valve, the inner torus chamber is also suppliable with hydraulic fluid by a first valve device and a throttle device, the throttle device positioned downstream of the first valve device, wherein, in a first switching position of the converter switching valve corresponding to an open operating state of the converter lock-up clutch, the converter pressure valve is connected through the inner torus chamber of the torque converter to a transmission cooler and a transmission lubrication circuit, and a check valve device is provided on an output of the inner torus chamber of the hydrodynamic torque converter between the inner torus chamber and the transmission cooler and transmission lubrication circuit, and wherein, in a second switching position of the converter switching valve in which the converter lock-up clutch is subjected to the operating pressure, the converter pressure valve is connected by the converter switching valve both to the transmission cooler and the transmission lubrication circuit and to an entry of the inner torus chamber of the torque converter, and the inner torus chamber is connected by the converter switching valve and the check valve device to an essentially unpressurized area on the output of the inner torus chamber.

11. The hydraulic system of claim 10, wherein the check valve device includes a check valve arranged between the output of the inner torus chamber and the converter switching valve, the response limit of the check valve being variable.

12. The hydraulic system of claim 10, wherein the check valve device includes a check valve arranged between the output of the inner torus chamber and the converter switching valve and an additional check valve provided between the converter switching valve and the essentially unpressurized area, a response limit of the check valve being less than a response limit of the additional check valve.

13. The hydraulic system of claim 10, wherein the check valve device includes a check valve arranged downstream of the inner torus chamber and between the converter switching valve and the transmission cooler and transmission lubrication circuit, the check valve device also includes an additional check valve provided between the converter switching valve and the essentially unpressurized area, a response limit of the check valve being less than a response limit of the additional check valve.

14. The hydraulic system of claim 10, wherein the converter clutch valve and the converter switching valve are subjectable to a pilot pressure by an actuator device.

15. The hydraulic system of claim 10, wherein a second valve device is provided between the converter clutch valve and the converter lock-up clutch, a connection between the converter clutch valve and the converter lock-up clutch closable with the second valve device such that the second valve device maintains the operating pressure at the converter lock-up clutch.

16. The hydraulic system of claim 15, wherein a pressure signal is applicable at a valve slide of the second valve device, the pressure signal at the valve slide either establishing the connection between the converter clutch valve and the converter lock-up clutch or blocking the connection between the converter clutch valve and the converter lock-up clutch.

17. The hydraulic system of claim 16, wherein, at the valve slide of the second valve device, both the hydraulic pressure prevailing between the converter clutch valve and the second valve device and adjustable by the converter clutch valve and the hydraulic pressure prevailing between the second valve device and the converter lock-up clutch is applicable in a direction separating the connection between the converter clutch valve and the converter lock-up clutch or in a direction releasing the connection between the converter clutch valve and the converter lock-up clutch.

* * * * *